United States Patent Office 3,573,168
Patented Mar. 30, 1971

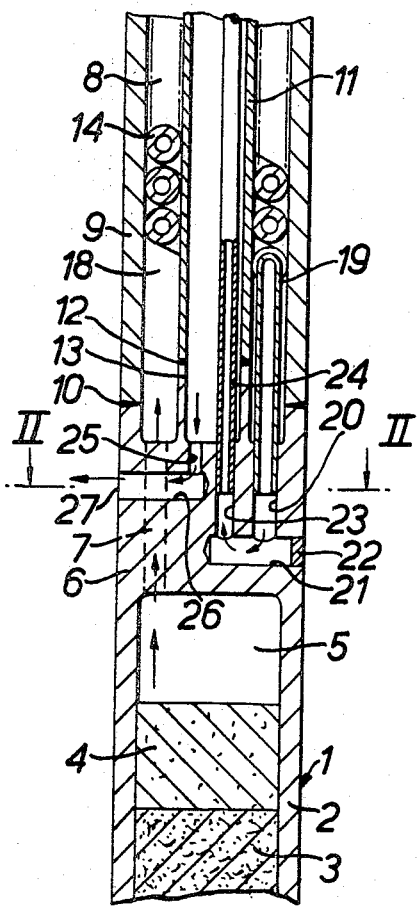
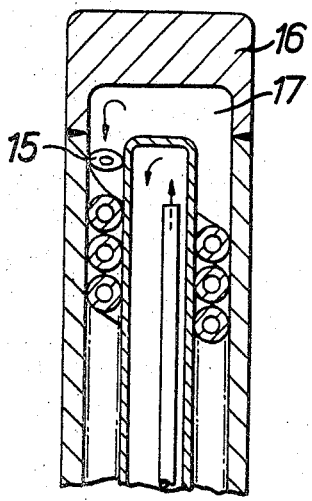
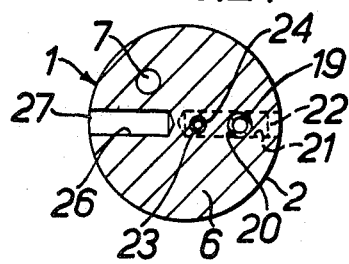
FIG. 1.
FIG. 2.

3,573,168
NUCLEAR FUEL VENTING ELEMENTS FOR THE DISCHARGE OF FISSION GASES
Ronald Hugh Campbell, Bowden, England, assignor to United Kingdom Atomic Energy Authority, London, England
Filed May 2, 1968, Ser. No. 726,155
Claims priority, application Great Britain, May 16, 1967, 22,767/67; June 15, 1967, 27,628/67
Int. Cl. G21c 3/02
U.S. Cl. 176—68          10 Claims

ABSTRACT OF THE DISCLOSURE

To allow decay of some of the gaseous fission products produced from nuclear fuel under irradiation before discharge of said products from the interior of a nuclear reactor fuel element of the vented type to the exterior surroundings of the fuel element, there is included within the fuel element a passage-defining component such as a capillary tube, an external surface of which defines an additional passage in series with the passage defined by the component, the two passages together providing a vent path for gaseous fission products. Alternatively or in addition, tubing in communication with the interior of the fuel element extends at least in part over the external surface of the fuel element and provides a vent path or additional vent path. Such tubing may be in the form of a capillary tube coiled over said surface which serves also for fuel element spacing and to improve heat transfer to coolant flowing over the fuel element.

BACKGROUND OF THE INVENTION

This invention relates to nuclear reactor fuel elements of the vented type, that is, although the elements are sheathed, they are adapted for the removal from within the sheathing during operation of gases released by the fuel content as a result of irradiation.

Application Ser. No. 481,815 filed Aug. 23, 1965, now Pat. No. 3,357,893, having a common assignee with the present application, claims the invention of a fuel element of the vented type for a fluid cooled nuclear reactor, having a fuel-containing protective sheath of elongated form and comprising means defining a vent path unobstructed by fuel and having permanently open communication with the fuel adjacent one end, the other end of the vent path being an outlet in open communication with the exterior surroundings of the sheath for discharge into these surroundings of gases released by the fuel during operation of the element, and the length of the vent path between said one end and the outlet being longer than the fuelled length of the sheath in order to promote the decay before discharge of short-lived gaseous phase fission products included in the released gases. The specification of said application describes various embodiments of the said invention, such embodiments involving the discharge of the gaseous phase fission products into coolant flowing over the fuel element.

In venting fission product gases into the main coolant stream of a liquid metal cooled reactor, one of the considerations is that there should not be sufficient release of delayed neutron precursors to interfere with delayed neutron monitoring for failed fuel cans. These precursors are isotopes of bromine and iodine with short half lives, the longest lived with significant neutron production being 87Br with a half life of 54.5 seconds. At typical operating temperatures, for a fast reactor cooled by liquid metal, which for example has a bulk inlet temperature of 400° C., these precursors will rapidly combine chemically with with sodium (or potassium) vapour which will be present at concentrations equivalent to the saturation level at the free interface between the vent path and the reactor coolant. The resuling salts will be solids with small but significant vapour pressures at reactor temperatures (of the order of 0.1 mm. Hg for NaBr at 400° C.) The solubility of the salts in the liquid metal coolant will effectively reduce their vapour pressure to zero at the coolant interface, and so there will tend to be rapid diffusion along a concentration gradient from the fuel end of the vent path. It can be shown that under these circumstances the attenuating factor for material in the vapour phase within a simple venting passage is an exponential function of passage length, increases of this length leading to major improvements in attenuation.

Bearing in mind that fuel elements for liquid metal cooled fast reactors are commonly in the form of long pins with diameters which in typical cases go down as low as 0.2″, the space available inside the sheathing for the provision of a vent path of long passage length is exceedingly limited. It is therefore an object of this invention to provide a fuel element for a liquid metal cooled fast reactor in which the vent path can be made longer than in fuel elements known hitherto, without needing to increase the length and diameter of the fuel element compared with such known fuel elements.

SUMMARY OF THE INVENTION

According to the invention, a fuel element for a liquid metal cooled fast reactor and of the vented type and having a fuel-containing sheath of elongated form, has a passage-defining component in said sheath and arranged so that an external surface of said component defines an additional passage in series with the passage defined by said component, the two passages constituting a gaseous fission products vent path unobstructed by fuel, one end of said vent path being in permenently open communication with said fuel, and the other end of said vent path being an outlet from said sheath and in open communication with the exterior surroundings of said sheath.

An advantage of the invention lies in the double duty performed by the introduced component, that is to say, the use of both interior and exterior surfaces to form parts of the gas removal path. This assists in making a removal path which, so far as included inside the sheathing, is of compact and therefore practical proportions.

More often than not the application of the invention in practice will result in the parts of the removal path formed by the component being in a re-entrant sequence, that is to say, a sequence of flow paths defined by discontinuous components, one flow path being in the opposite direction relative to the next flow path in the sequence.

Alternatively or in addition, the fuel element may have a length of tubing extending at least in part over the external surface of said sheath, one end of said tubing being in permanently open communication with the interior of said sheath, and the other end of said tubing being in open communciation with the exterior surroundings of said sheath, the tubing forming a vent path for gaseous fission products arising from said fuel.

It is preferred that the tubing extends over substantially the entire length of the element; in the case where the tubing is not combined with any extended passage within the sheathing, it is longer than the fuel length. Thus the tubing can perform an important supplementary function, namely the spacing of the element from adjacent elements and/or the influencing of the mode of flow of a coolant over the external sheathing surface.

It will be appreciated that the tubing stands proud on the sheathing surfaces and there is formed in effect a hollow rib or fin. A typical configuration is a helix of open pitch formed by wrapping around an outer external surface of the sheathing. If there is also an inner external surface, as in the case where the element is of tubular type, it may be possible to arrange a helix on the inner surface. If a multi-start helix were to be required a longer single path, rather than several shorted parallel paths could be formed by connecting in series.

In order to retard diffusion in the gas removal path the bore of the length of tubing should be small and capillary tube is therefore suitable. The use of capillary tube in a vent path has already been described in said application Ser. No. 481,815; the present invention, however, renders the tubing capable of serving a duel purpose. If one considers the slender kind of element or pin which is currently in favour for liquid metal cooled fast reactors and the close spacing with which such pins are clustered in a fuel assembly, the gap between neighbouring pins may only be suitable for capillary tubing. By wrapping the tubing in a long pitch helix, the pins may be so arranged in the cluster that the respective tubes, acting as spacers, abut the sheathing of the adjacent pins rather than the tubing and thereby produce a spacing equivalent to one tube diameter. If more space is available a slightly larger bore tube can be employed with a finer bore tube installed within it with a clearance fit, the bores being connected in series.

DESCRIPTION OF THE DRAWINGS

Constructional examples embodying the invention hereinbefore referred to will now be described with reference to the accompanying drawings, wherein:

FIG. 1 is a fragmentary side eview in medial section of part of a nuclear reactor fuel pin, FIG. 2 is a plan view on line II—II of FIG. 1.

DESCRIPTION OF THE EMBODIMENTS

Figure 3:
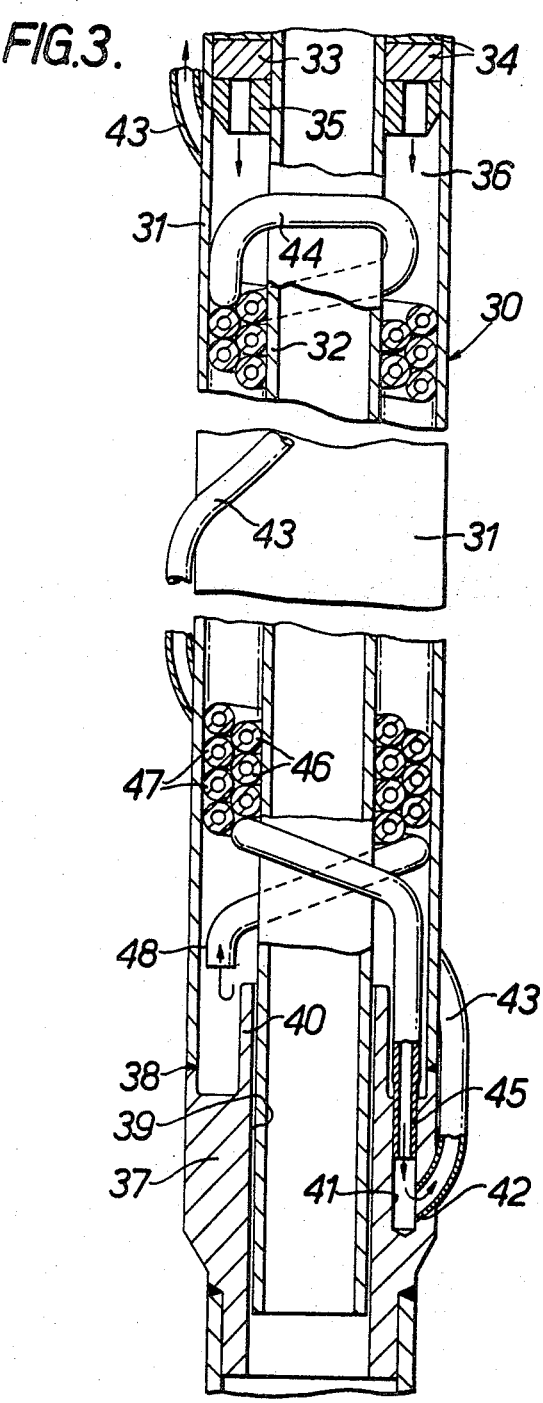
FIG. 3 is a fragmentary side view, partly in medial section, of part of a fuel pin of the tubular kind, and illustrates another construction.

Referring to FIGS. 1 and 2 of the drawings, in which the upper part of a nuclear reactor fuel pin is illustrated, the fuel pin is intended for use with a multiplicity of similar fuel pins arranged in cluster form in a fuel sub-assembly, a plurality of fuel sub-assemblies being arranged together to form the core of a sodium-cooled fast reactor. Each pin 1 has hollow cylindrical sheathing 2 containing nuclear fuel 3 in either stacked pellet or vibrocompacted particle form (as shown). Above the fuel 3 is a porous fuel retaining pellet 4, and a gaseous fission product collecting chamber 5 is disposed above the pellet 4, the upper end of the chamber 5 being defined by a closed end 6 of the sheath 2. The sheath is 0.2" outside diameter and of wall thickness 0.015".

The closed end 6 is penetrated by an aperture 7 which communicates with an annular compartment 8 formed within a sheath extension 9 welded to the closed end 6 at 10. The extension contains a closed-ended tube 11 whose open end is welded at 12 to a spigot 13 on the end 6. The annular space between the wall of the extension 9 and the exterior of the tube 11 forms the compartment 8. The latter is occupied by coiled capillary (e.g. 0.02" bore) tubing 14, there being longitudinal clearance between adjacent coils but the coils being a good fit against the internal surface of the extension 9 and the exterior of the tube 11. The upper end 15 of the capillary tubing 14 is open and terminates short of a closed end 16 of the extension 9 so as to form a small upper plenum 17, the closed end of the tube 11 also being spaced from the end 16. The coils of the capillary tubing 14 terminate short of the lower end of compartment 8 so as to form a small annular plenum 18, and the lower end 19 of the capillary tubing straightens and is swaged down and extends longitudinally across the plenum 18 and terminates as an interference fit in a longitudinal bore 20 in the end 6, the bore 20 communicating with a transverse bore 21 in the end 6, the outer end of which is plugged at 22. A longitudinal bore 23 in the end 6 extends from the bore 21 into the interior of the tube 11, and the lower end of a longitudinal capillary tube 24 within the tube 11 is an interference fit in the bore 23. The capillary tube 24 has an open upper end and extends to just short of the closed end of the tube 11. Finally a short longitudinal bore 25 in the end 6 extends from the interior of the tube 11 to a transverse bore 26 in the end 6, the bore 26 having outlet to the exterior of the fuel pin 1 at 27.

In operation, gaseous fission products produced by irradiation of the fuel 3 pass through the pellet 4 and collect in the space 5. From thence they pass, as indicated by the arrows, through the aperture 7 to the lower plenum 18 and from thence along an extended helical path defined by the exterior of the capillary tube 14, the interior of the extension 9 and the exterior of the tube 11, to the plenum 17, from thence they enter the open end 15 of the tubing 14 and flow therein in an extended helical path to the bore 20 and from thence via the bores 21 and 23 to the interior of the tube 24. Having flowed up the tube 24, they return down the tube 11 outside the tube 24 and finally pass to the exterior of the fuel pin at 27 via bores 25 and 26. The extended flow path as described ensures that sufficient delay is effected before discharge to the exterior flowing coolant. The provision of the tube 24 within the tube 11 provides a buffer space or lute, so that, should the pressure of the fission product gases be exceeded by the external head of sodium there is sufficient space to accommodate inflowing sodium without pin flooding, and there is also sufficient space for a slow build up of gaseous fission product pressure sufficient to eject that sodium and for the gases to discharge into the external sodium.

FIG. 3 illustrates the combination of two different features of the invention, either of which can be employed separately if desired. The particular design to which these features are supplied is that of a tubular fuel pin for a sodium-cooled fast nuclear reactor, but either or both features can equally be employed with a non-tubular design, and possibly also to fuel elements for other types of reactor.

The first features illustrated is the provision of a capillary (e.g. 0.02" bore) tube disposed in coils around the external sheath of the fuel pin and serving as an extended vent path for gaseous fission products. The tubular fuel pin 30, the lower portion only of which is shown, consists of an outer tubular sheath 31 and an inner tubular sheath 32, the annular space 33 between serving to accommodate the fuel 34, either in stacked annular pellet form (as shown) or vibrocompacted particle form. A perforated platform 35 secured to one of the sheaths separates the fuel from a fission product gas plenum 36 and also serves to preserve concentricity of the sheaths 31, 32.

Imagine for the moment that the gas plenum 36 is unoccupied by coiled capillary tubes. The annular space which forms the gas plenum 36 extends to the lower end region of the fuel pin 30 (the lowermost end region, not shown, serves only for mounting of the fuel pin in a fuel element sub-assembly and for entry of coolant to the interior of the inner sheath 32) and the lower end wall of the plenum 36 is defined by an annular member 37 welded to the lower end of the outer sheath 31 at 38. The bore 39 of the member 37 accommodates the inner sheath 32 with clearance (to allow for differential expansion between sheaths 31 and 32 which are secured to one another sealingly at the non-shown upper end of the fuel pin) and the member 37 also has a sleeve extension 40 to provide extended support for the inner sheath 32 to avoid jamming. The member 37 is penetrated longitudinally by a bore 41 into which the lower end 42 of a capillary tube 43 extends and is sealed. The capillary tube 43 is coiled upwardly around the exterior of the outer sheath 31 and its open upper end terminates at the upper end of the fuel pin (not shown) to provide an outlet for fission product gases to the coolant flowing over the exterior of the fuel pin. The capillary tube 43 serves not only to provide, with the plenum 36, an extended flow path for fission product gases, but also serves to conduct such gases to the upper end of the fuel pin where, assuming upward flow of coolant, the pressure head of coolant is lower. Furthermore, it avoids discharging fission product gases at a position where the rising mass of bubbles thereof in the coolant could interfere with removal of heat by the coolant from the fuel section of the fuel pin and possibly cause hot spots. Still further, the capillary tube 43 serves as a fin or rib on the outer sheathing and assists in heat removal by the coolant by promoting turbulence. Lastly, the capillary tube serves for spacing the fuel pin from adjacent fuel pins in a cluster thereof in a fuel subassembly, the capillary tube contacting the exterior of the outer sheaths of such adjacent pins. If desired there may be further bores 41 in the member 37 to allow the provision of multi-start capillary tubes. Alternatively, there may be a single bore 41 and the separate sets of coils provided by multistart being connected in series with flow reversal at each end.

The employment of the external coiled capillary tube or tubes 43 is also advantageous in that it allows the plenum 36 to be provided at the lower, cool, end of the fuel pin, so that gas collected therein will occupy a smaller volume compared with the provision of the plenum at the upper, hotter end of the fuel pin (assuming upward flow of coolant).

Although the provision of the externally coiled capillary tube per se is considered to be acceptably satisfactory in operation, it is subject to one inherent criticism when employed with liquid coolants such as sodium. In operation, the static head of sodium external to the fuel pin means that the capillary tube 43 will normally contain sodium, resulting in the discharge of fission product gas being intermittant instead of continuous and occuring only when the fission product gas pressure exceeds that due to the static head of sodium. Such intermittant discharge could lead to freshly generated fission products, i.e. those not subject to long diffusion delay in the capillary tube, being discharged, and these may well contain undesirable amounts of delayed neutron precursors, which could affect the operation of the equipment for detecting failed fuel elements by producing a masking background signal on the bulk coolant monitor. However, calculations show that this problem resolves itself if the total contained volume of the capillary tube 43 is greater than 0.5 cu. in.

Another way of relieving this problem is by incorporating in addition to the capillary tube 43 the further extended vent path shown in FIG. 3 and ignored in the description so far. Instead of providing empty plenum space below the fuel, the space 36 is partially occupied by doubly coiled capillary tubing 44. One end 45 of the tubing 44 is an interference fit in the bore 41 of the member 37. From thence the tubing 44 is provided in a first set of close-fitting coils 46 extending upwardly on the inner sheath 32. Near the top of the space 36, the tubing direction is reversed and a second set of close-fitting coils 47 is provided fitting snugly on the coils 46. The two sets of coils just occupy the whole width of the annulus of the space 36. The end 48 of the tubing 44 is open and disposed in the lower end region of the space 36. Fission product gases from the fuel 34 flows in an extended path over the exterior of the coils 46, 47, the path being serpentine as a result of the close packing of the coils. The gases then enter the open end 48 of the coil 47 and traverse the double helical path provided by the coils 47, 46, leaving the tubing 44 at the end 45 and passing via bore 41 to the external coils of tubing 43. It will be appreciated that the additional path length over that provided by the tubing 43 gives additional vent path volume for alleviation of the problem hereinbefore referred to.

It is also envisaged that the long vent path provided by the double coiled capillary tubing as hereinbefore described with reference to FIG. 3 can be employed without the coiled capillary provided on the exterior of the fuel pin. In this case, to ensure discharge of fission product gases to the coolant at a desirable position, the extended vent path provided by the double coiled capillary tube disposed internally of the pin would be provided above the fuel-containing part of the fuel pin, where coolant flow is upwardly.

I claim:

1. For a liquid metal cooled fast nuclear reactor, a fuel element of the vented type and having a fuel-containing sheath of elongated form, a length of tubing extending at least in part over the external surface of said sheath, in close proximity thereto one end of said tubing being in permanently open communication with the interior of said sheath, and the other end of said tubing being in open communication with the exterior surroundings of said sheath, the tubing forming a vent path for gaseous fission products arising from said fuel.

2. A fuel element according to claim 1, wherein said tubing is in the form of coils around the external surface of said sheath and extending over a major proportion of the whole length thereof.

3. For a liquid metal cooled fast nuclear reactor, a fuel element of the vented type and having a fuel-containing sheath of elongated form, a passage-defining component in said sheath, an external surface of said component defining an additional passage in series with the passage defined by said component, the two passages constituting part of a gaseous fission products vent path unobstructed by fuel, one end of said vent path being in permanently open communication with said fuel, a length of tubing one end of which is in communication with said fuel, a length of tubing one end of which is in communication with the other end of said partvent path, said tubing forming the remainder of said vent path, penetrating said sheath, the portion of said tubing outside sheath being in the form of coils around the external surface of said sheath and extending over a major portion of the whole length of said sheath and the tubing having its other end open and in open communication with the exterior surroundings of said sheath.

4. For a liquid metal cooled fast nuclear reactor, a fuel element of the vented type and having a fuel-containing sheath of elongated form, a passage-defining component in said sheath, an external surface of said component defining an additional passage in series with the passage defined by said component, the two passages constituting a gaseous fission products vent path unobstructed by fuel, one end of said vent path being in permanently open communication with said fuel, and the other end of said vent path being an outlet from said sheath and in open communication with the exterior surroundings of said sheath, said component being a coiled capillary tube disposed within a larger tube so that said additional passage is defined by the interior of said larger tube and the exterior of said coiled capillary tube, and the other passage is defined by the interior of said coiled capillary tube.

5. A fuel element according to claim 4, wherein one end of said larger tube is in permanent open communication with said fuel, the other end of said larger tube being in communication with an open end of the coiled capillary tube, and the other end of said coiled capillary tube being in communication with the exterior surroundings of the sheath.

6. A fuel element according to claim 4, wherein said series-connected passages are in re-entrant sequence.

7. A fuel element according to claim 4 including an inner member disposed concentrically within said larger tube, the coils of said coiled capillary tube being interposed between said larger tube and said inner member, and said additional passage being defined by the interior of the larger tube, the exterior of the inner member and the exterior of the coiled capillary tube.

8. A fuel element according to claim 7, wherein said coiled capillary tube is constituted by two coil sets, one set comprising inner coils and the other set comprising outer coils doubled back over said inner coils, the two sets being connected in series and disposed in the annulus between said larger tube and said inner member.

9. A fuel element according to claim 7, wherein said coiled capillary tube is constituted by two coil sets, one set comprising inner coils and the other set comprising outer coils doubled back over said inner coils, the two sets being connected in series and disposed in the annulus between said larger tube and said inner member, there being in addition an exterior capillary tubing communicating at one end with one end of the series conncted coils, the said exterior tubing penetrating to the exterior of said sheath and extending in the form of a coil around the external surface of said sheath over a major portion of the whole length of said sheath, and the said exterior tubing having its other end open and in open communication with the exterior surroundings of said sheath.

10. A fuel element according to claim 7, including an exterior capillary tubing communicating at one end with one end of said capillary tube within said sheath, the said exterior tubing penetrating to the exterior of said sheath and extending in the form of a coil around the external surface of said sheath over a major portion of the whole length of said sheath, and the said exterior tubing having its other end open and in open communication with the exterior surroundings of said sheath.

References Cited
UNITED STATES PATENTS

| | | | |
|---|---|---|---|
| 3,356,585 | 12/1967 | Zebroski | 176—37X |
| 3,357,893 | 12/1967 | Gatley et al. | 176—37 |
| 3,406,094 | 10/1968 | Beisswenger et al. | 176—37X |

LELAND A. SEBASTIAN, Primary Examiner

G. G. SOYLST, Assistant Examiner

U.S. Cl. X.R.

176—37, 81